(12) United States Patent
Posnansky

(10) Patent No.: US 8,844,213 B2
(45) Date of Patent: Sep. 30, 2014

(54) DEVICE FOR GENERATING SOLAR POWER

(75) Inventor: Mario Posnansky, La Sage (CH)

(73) Assignee: Frank Posnansky, La Sage (CH)

( * ) Notice: Subject to any disclaimer, the term of this patent is extended or adjusted under 35 U.S.C. 154(b) by 378 days.

(21) Appl. No.: 12/936,858

(22) PCT Filed: Apr. 8, 2009

(86) PCT No.: PCT/CH2009/000115
§ 371 (c)(1),
(2), (4) Date: Jan. 3, 2011

(87) PCT Pub. No.: WO2009/124409
PCT Pub. Date: Oct. 15, 2009

(65) Prior Publication Data
US 2012/0272591 A1    Nov. 1, 2012

(30) Foreign Application Priority Data
Apr. 8, 2008 (CH) ........................ 552/08

(51) Int. Cl.
| E04D 13/18 | (2014.01) |
| E04D 1/00 | (2006.01) |
| E04D 1/34 | (2006.01) |
| H01L 31/042 | (2014.01) |
| E04D 1/22 | (2006.01) |
| H01L 31/048 | (2014.01) |
| F24J 2/52 | (2006.01) |
| E04D 1/12 | (2006.01) |

(52) U.S. Cl.
CPC . *E04D 1/22* (2013.01); *Y02B 10/12* (2013.01); *H01L 31/0483* (2013.01); *Y02E 10/50* (2013.01); *F24J 2/5258* (2013.01); *E04D 1/125* (2013.01); *Y02E 10/47* (2013.01); *H01L 31/0422* (2013.01)

USPC .............. 52/173.3; 52/520; 52/521; 52/543; 52/544; 52/548; 52/549; 52/550; 136/244

(58) Field of Classification Search
USPC ........ 52/520, 521, 543, 544, 548–550, 173.3; 136/244
See application file for complete search history.

(56) References Cited

U.S. PATENT DOCUMENTS

| 345,089 | A | * | 7/1886 | Walter | 52/520 |
| 487,585 | A | * | 12/1892 | Schetzel | 52/478 |
| 1,493,374 | A | * | 5/1924 | Mountford, Jr. | 52/547 |
| 1,538,235 | A | * | 5/1925 | Bell et al. | 52/548 |
| 1,540,960 | A | * | 6/1925 | Sherman | 52/543 |
| 1,582,018 | A | * | 4/1926 | Bergner | 52/548 |
| 1,626,780 | A | * | 5/1927 | Bickell | 52/547 |
| 1,659,903 | A | * | 2/1928 | Wolf | 52/544 |
| RE17,957 | E | * | 2/1931 | Lietz | 52/532 |
| 1,895,038 | A | * | 1/1933 | Jones | 52/520 |
| 1,936,055 | A | * | 11/1933 | Heaney | 52/543 |
| 2,191,668 | A | * | 2/1940 | Knudsen et al. | 52/553 |
| 2,351,993 | A | * | 6/1944 | Miles et al. | 52/543 |
| 3,209,506 | A | * | 10/1965 | Waske | 52/520 |
| 3,210,896 | A | * | 10/1965 | Detman | 52/22 |
| 4,720,955 | A | * | 1/1988 | Kane | 52/519 |
| 5,442,888 | A | * | 8/1995 | Ilnyckyj | 52/524 |
| 5,990,414 | A | * | 11/1999 | Posnansky | 136/244 |
| 7,441,383 | B2 | * | 10/2008 | O'Neal | 52/551 |
| 2004/0000334 | A1 | | 1/2004 | Ressler | |
| 2005/0260786 | A1 | * | 11/2005 | Yoshikawa et al. | 438/85 |
| 2011/0041428 | A1 | * | 2/2011 | Posnansky | 52/173.3 |

FOREIGN PATENT DOCUMENTS

| DE | 10046134 A1 | 4/2002 |
| FR | 2354430 A1 | 1/1978 |
| WO | WO 01/36882 A1 | 5/2001 |
| WO | WO 2007/035677 A2 | 3/2007 |
| WO | WO 2008/092290 A8 | 8/2008 |

\* cited by examiner

*Primary Examiner* — Phi A
*Assistant Examiner* — Omar Hijaz
(74) *Attorney, Agent, or Firm* — Michael J. Femal; Much Shelist

(57) ABSTRACT

The modular unit for generating solar power comprises a plurality of diamond-shaped cover plates (3.2, . . . , 3.3) for forming a surface trapping sunlight. The cover plates (3.2, 3.3) contain photovoltaic elements (106.1, 106.2, 106.3). The system further comprises a plurality of support rods (54) having a number of pre-manufactured fastening positions (55), said rods being arranged at a predetermined angle >0° to the horizontal and extending in the direction of a line of slope. Every fastening position is associated with a fastening device (50) which connects two corners of the overlapping cover plates (3.2, 3.3) to the support rod (54) in the fastening position. The cover plates (3.2, 3.3) are arranged diagonally and so as to overlap in a scale-type fashion with respect to a longitudinal direction of the support rod (54) in such a manner that the surface trapping the sunlight is at the same time rain water-repellent. The cover plates (3.2, 3.3) have a first cut-out section (15.3) in a first corner section and a second cut-out section (20.2) in a diagonally opposite second corner section, in which second cut-out section one of the fastening devices (50) engages. The fastening device (50) holds the first corner section of the first cover plate (3.3) in a first supported position at a first distance to the support rod (54) and the second corner section of the second cover plate (3.2) in a second supported position at a second distance to the support rod (54), the first corner section of the first cover plate (3.3) being interspaced from the second corner section of the second cover plate (3.2) by at least one cover plate thickness.

30 Claims, 9 Drawing Sheets

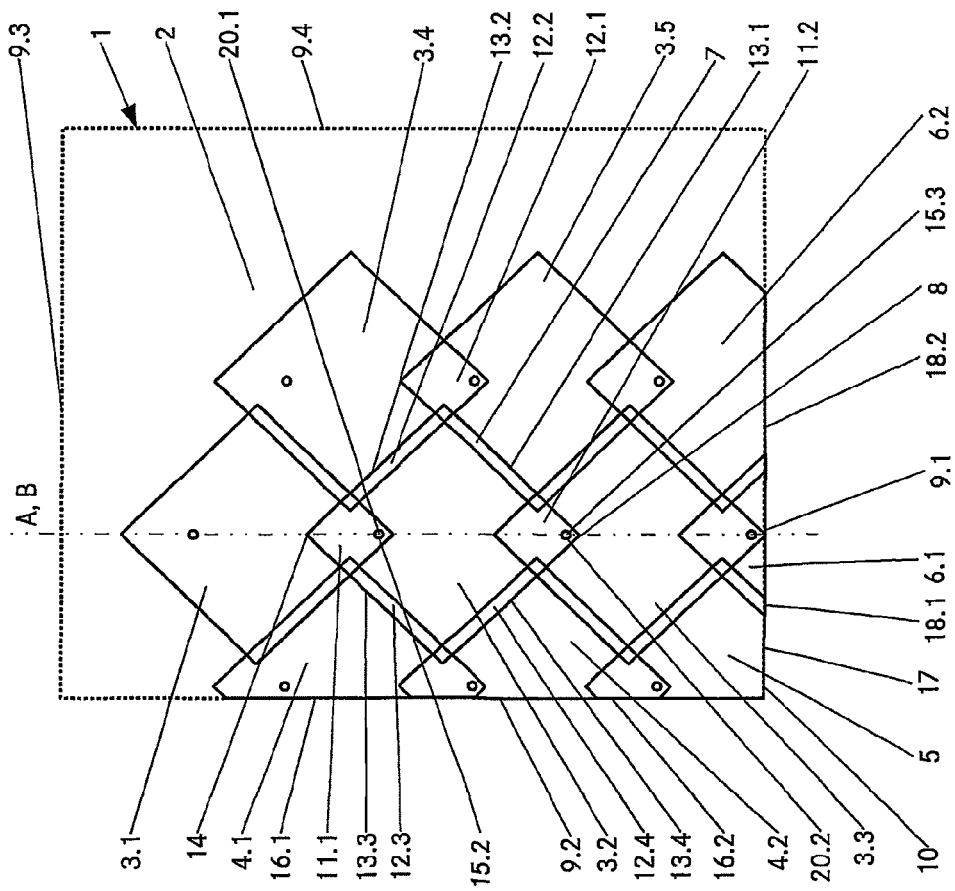

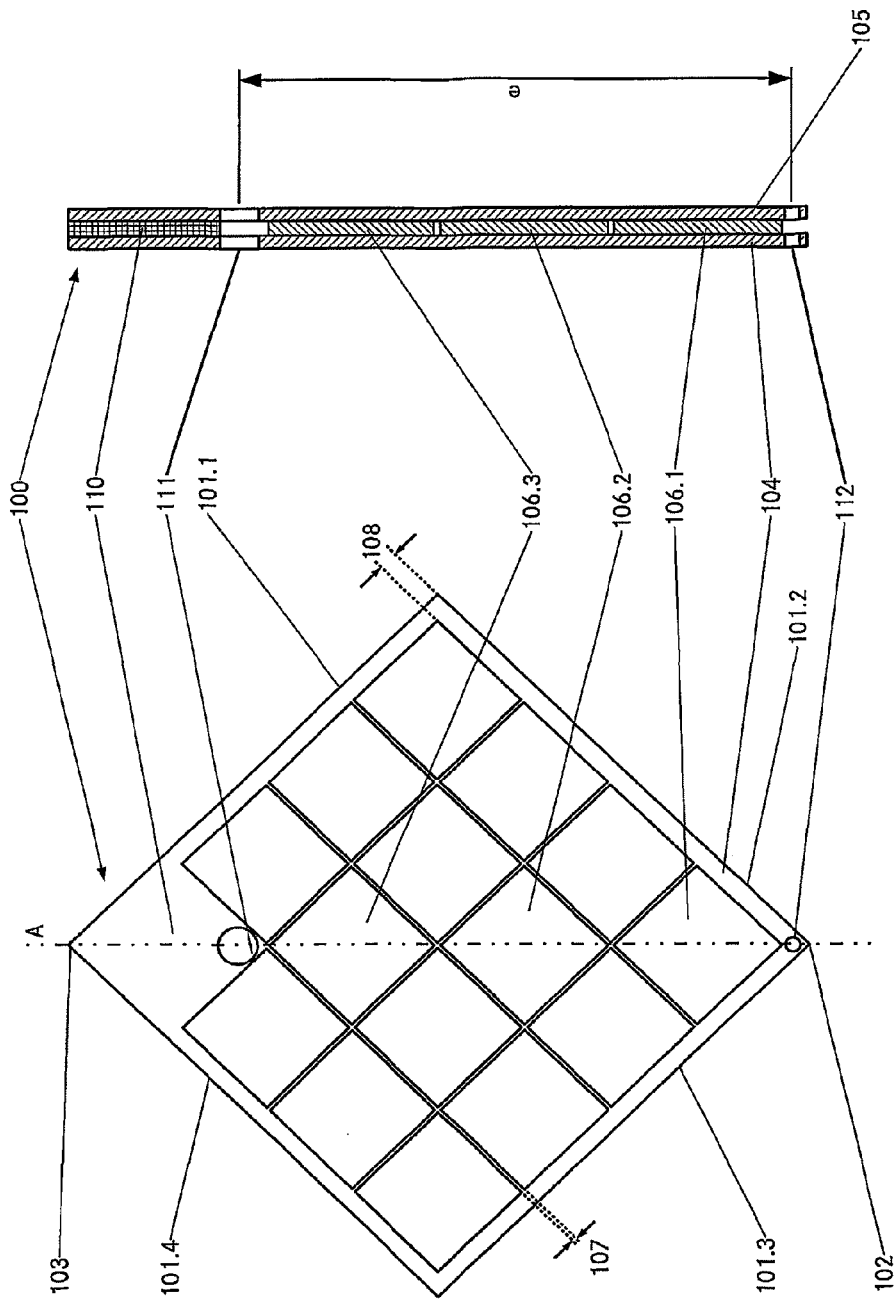

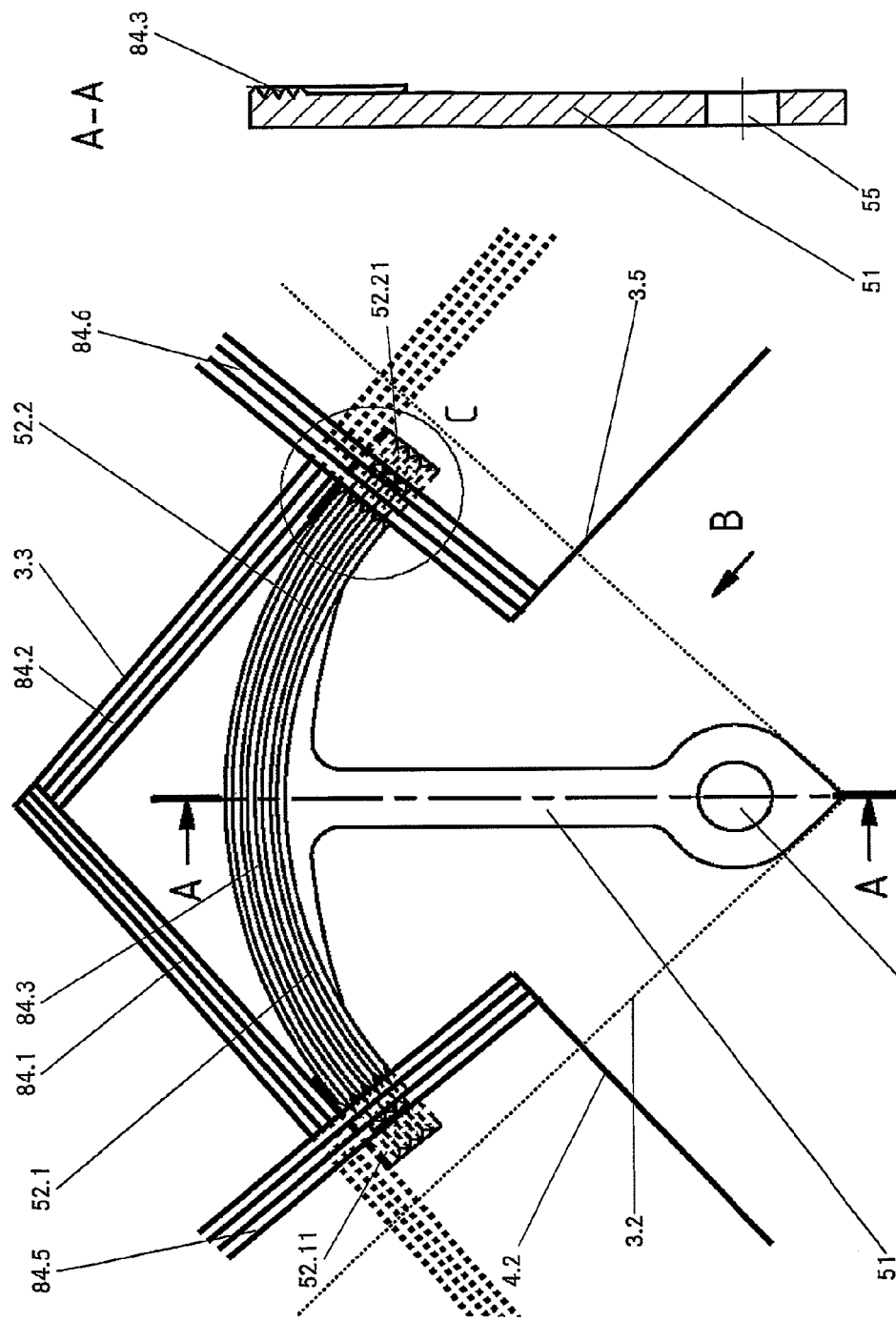

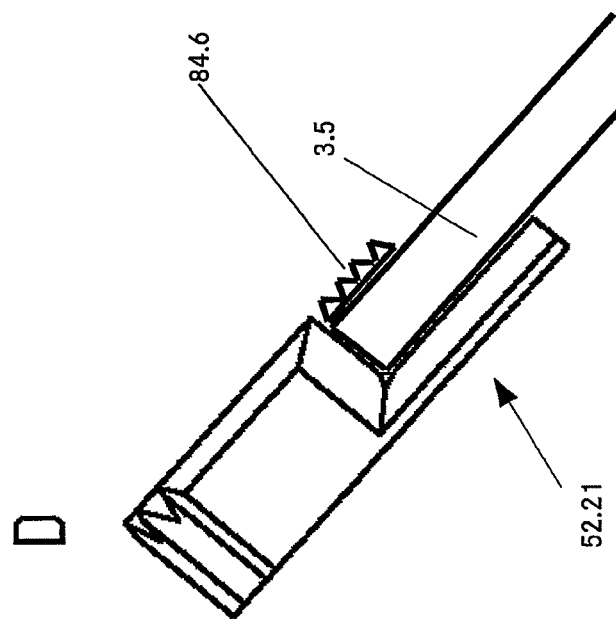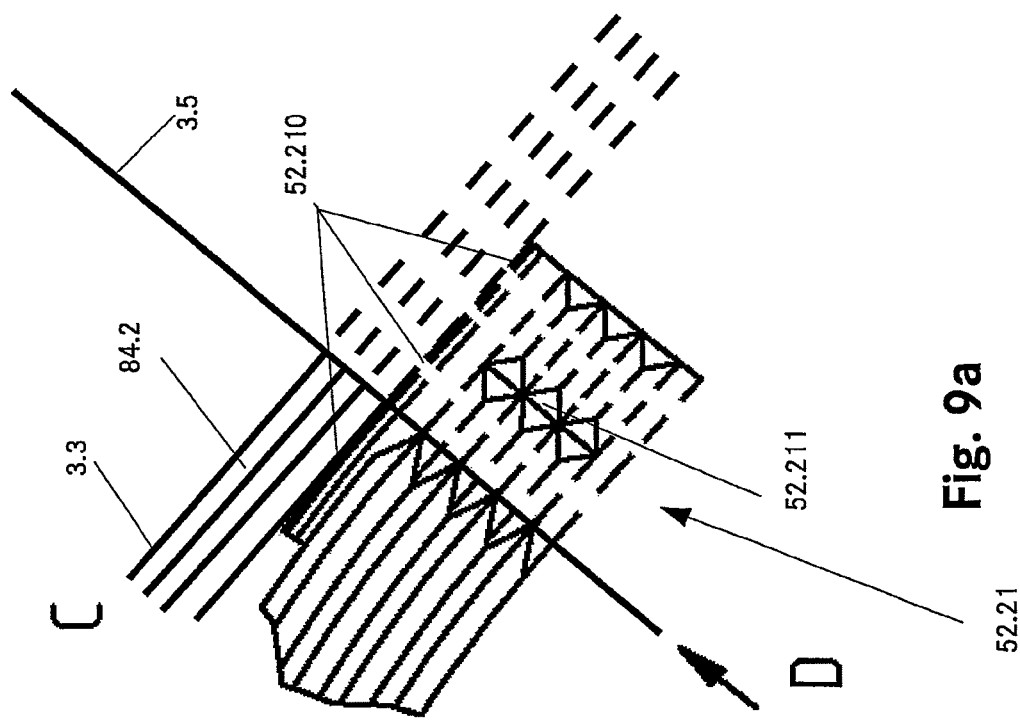
Fig. 9a
Fig. 9b

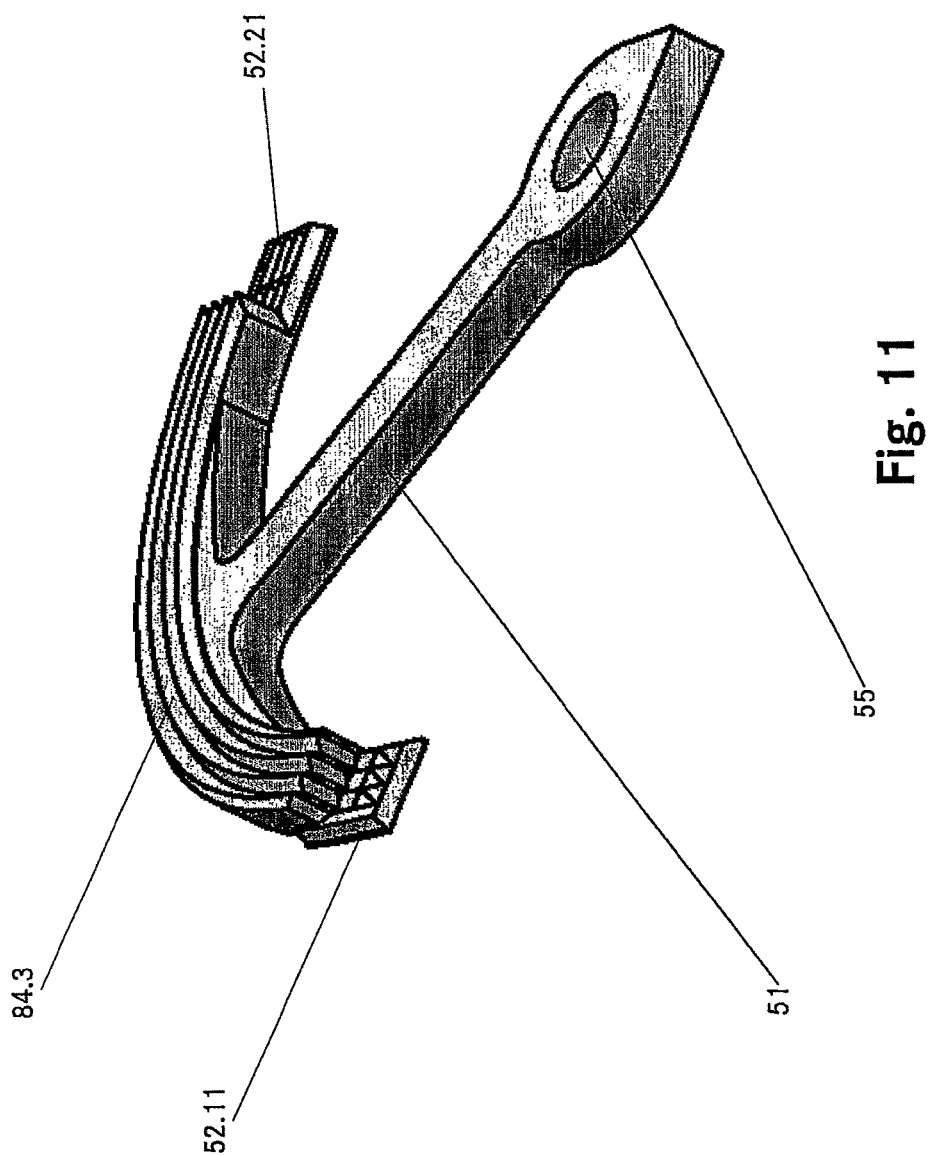

DEVICE FOR GENERATING SOLAR POWER

TECHNICAL DOMAIN

The invention relates to a device for generating solar power comprising at least four diamond-shaped cover plates for forming a surface which captures sunlight, photovoltaic elements being contained in the cover plates, and at least one fastening device which connects the cover plates assigned to the fastening site to a support bar at this fastening site. Furthermore the invention relates to a component system for preparing this device.

PRIOR ART

The use of the solar radiation which is incident daily on rooves and facades of inhabited or uninhabited buildings to obtain energy in the form of electrical current and heat has already acquired great importance.

Photovoltaic modules are being increasingly mounted on rooves nowadays. With respect to minimizing costs, there is interest in being able to integrate the photovoltaic modules in the outer building skin (roof, facade) which is used as weather protection. This means that the structure which holds the photovoltaic modules performs two functions.

The photovoltaic modules or roof elements themselves consist essentially of thin, flat, brittle silicon solar cells (in strip or disk form) which are embedded in an elastic transparent material, generally EVA (ethyl vinyl acetate), between a transparent front plate of tempered glass or plastic and a back film or another glass plate for protection against mechanical and chemical damage. The solar cells are electrically connected to one another so that the generated module voltage can be tapped via a terminal outlet which is generally located on the back. A host of these modules or roof elements are further connected in series and in parallel in order to obtain the respectively desired system voltage or direct current power. Generally the current is fed into the public grid via a rectifier or for small island installations is interim-stored in batteries.

DE 100 46 134 discloses solar tiles for preparing a weatherproof solar roof. The tiles consist for example of an essentially diamond-shaped carrier plate with a somewhat smaller square solar cell which is located flush in the (lower) corner of the carrier plate so that the carrier plate projects on two sides or there is a region free of solar cells. The tiles are fastened with the side or corner at the top to horizontally running mounting rails. The mounting rail has an essentially U-shaped cross section with a profile section which projects toward the top in the manner of a nose on the open side. The tile on the upper end has a through hole through which a pin is guided which can be suspended on the mounting profile. On the mounting rail there is a sealing lip which covers the gap between the mounting rail and the tile.

International application PCT/CH2008/000032 discloses a weatherproof building jacket, especially a pitched roof, with several square weatherproof plates which are laid with respect to the line of slope in a diagonal position with scale-like mutual overlapping. The plates are connected to a support structure on a corner region which lies underneath with respect to the line of slope, for the indicated corner region of the plate there being one sealing element at a time which closes a gap between plates which are arranged transversely to the main direction at the same height. Here the rectangular plates in two opposite corner regions each have one through opening for a fastener so that the plates are connected to the support structure on their corner regions which lie top and bottom in the main direction.

The economic success of an outer building skin depends on its being able to be quickly and easily prepared and nevertheless its having the required weatherproof qualities. Last, but not least, the aesthetics should not suffer under the technical requirements.

DESCRIPTION OF THE INVENTION

The object of the invention is to devise a device which belongs to the initially mentioned technical domain for generating solar power and which is aesthetically pleasing and can be easily and quickly prepared on site. In particular it should also be possible to replace defective cover plates without a larger number of adjacent cover plates having to be removed.

This object is defined by the features of claim 1. According to the invention, the device encompasses several, specifically at least four, preferably diamond-shaped cover plates, at least one (but typically several) support bars and at least one (but typically at least one per cover plate) fastening device. The cover plates in concert form a surface which captures sunlight with photovoltaic elements (solar cells) which are arranged (sealed) in the cover plates. The cover plates as claimed in the invention are laid in a position superimposed in the manner of scales, especially in a diagonal position with respect to the line of slope of the indicated surface. The incline of the support bars on which the cover plates are held will be in a direction which deviates from the horizontal alignment (=angle 0°) and will be so great that the tilt of the individual cover plate (whose tilt is of course smaller as a result of the scale-like arrangement) is enough for rain water to run off reliably along the line of slope. One example is an angle of at least 3°.

The support bars have several, specifically at least three prefabricated fastening sites. The fastening sites (which can be for example threaded holes or simple drill holes) are therefore not made on site, but in the production of the support bars. The fastening sites therefore have CNC-produced precision. While holes made on site generally have a position tolerance in the millimeter range, the CNC tolerance is easily less than 1/10 mm (generally 1/100 mm or better).

The cover plates are held with fastening devices on the support bars. There is at least one fastening device as claimed in the invention. It is attached at one of the fastening sites. Fundamentally there is one fastening device per cover plate, on the fastening device two cover plates being supported preferably with the first and second corner region so that the cover plates with respect to the lengthwise direction of the support bars are preferably arranged diagonally overlapping one another in the manner of scales and in this way at the same time make the sunlight-capturing surface rain water-repellant. In the preferred first or second corner region each cover plate has a first and a second recess into which the fastening devices fit.

The fastening device is made such that it preferably keeps the first corner region of the first cover plate in a first support position at a first distance to the support bar and preferably the second corner region of the second cover plate in a second support position at a second distance to the support rod. Here the preferred first corner region of the first cover plate (viewed perpendicular to the support bar) is spaced away from the preferred second corner region of the second cover plate by at least the thickness of the cover plate.

The diagonal position is an especially preferred embodiment of the invention. The retaining and sealing system as claimed in the invention can however also be used for "straight" (i.e. non-diagonally) laid rectangular plates. For "straight" installation the, for example, rectangular plates have an edge side which runs transversely to the line of slope and one edge side which runs parallel to the line of slope, as is apparent, for example, from FIG. 1 of DE 100 46 134 (Arnold Glaswerke). For straight installation the recesses need not necessarily be arranged in the corner regions of the plates. They can be placed in the middle of one edge side.

Since the fastening sites are prepared mechanically and with high precision, mounting is much simpler and faster than if holes must be prepared on site. Matching between the support bar and cover plates is also free of error. Only one cover plate is ever attached on one support bar, there is no "bridging" between adjacent support bars. Accordingly the system as claimed in the invention is also less sensitive to imperfect positioning of the support bars relative to one another.

Since each cover plate is connected on its two diagonally opposite corners to the support bar, the device is also protected against wind gusts which could otherwise lift the cover plates.

In one system as claimed in the invention, it is possible to replace an individual cover plate in the middle in a larger surface by the two fastening devices which are assigned to the cover plate being (at least) partially detached.

Preferably the support bars consist of steel. They are made for example as a rectangular section or U-section so that they can be mounted on an underroof structure (which has laths which run parallel to the ridge). The sections can however also have a different shape (T, double-T, angle, etc) and can be fixed on the underroof structure with the corresponding clamps. The prepared fastening sites are for example threaded holes with a standard thread into which the fastening devices can be screwed. The fastening sites can also be welded pins or suitable shaped clips. A fastening site as claimed in the invention is characterized in that it stipulates an unequivocal position so that when the device is mounted on site it is not necessary to measure where the fastening device must be attached.

For reasons of economy it is advantageous if the device is made available as a complete system. This means that the support bars are made available with a length in which the roof or wall surface of the building is to be covered by the device as claimed in the invention. For example the support bars have a length which extends from the lower (horizontal) edge of the roof to the ridge of the roof. In general (when the device is in some position) the length of the support bars corresponds essentially to an extension of the surface in the direction of the line of slope. The cover plates are then attached only on the support bars and the connection to the building-side support structure takes place solely via the support bars.

Generally the surface which is covered with the device as claimed in the invention is rectangular and the support bars extend parallel to one another from one edge of the surface to the other. For large surfaces it is advantageous if the device is prepared from its individual parts on site. But it is also conceivable for the support bars to be connected among one another (for example by a frame) and for industrially prefabricated facade modules (with a plurality of cover plates) to be transported to the application site and to be mounted more or less in a component construction. In general however, with the component construction with respect to aesthetics less good designs can be implemented than with mounting on site.

Specifically it is desirable for the device as claimed in the invention to appear to the observer as an integrated part of the building and not as an added separate part. Therefore it is preferred that for example an entire roof surface be built according to the principle as claimed in the invention. In this sense individual cover plates can also be made solely of glass and without photovoltaics so that a window is formed for passage of light.

The underroof construction on which a device as claimed in the invention is mounted generally does not have weather protection, but only the thermal insulation and a vapor barrier. The object of the invention includes devising an economical building jacket with integrated photovoltaics. For this purpose it is necessary for the device to create sufficient weather protection (against rain and wind).

Preferably there is a plate-shaped sealing element for sealing against wind gusts. It is positioned at the fastening site with the fastening element where the second corner region of the second cover plate overlaps the first corner region of the first cover plate in the manner of scales. The sealing element is located between the two indicated corner regions and has a thickness which corresponds at least to the thickness of the cover plates. The sealing element closes a gap which is present between the neither overlapping nor touching cover plates which are placed laterally to the fastening site.

It is also possible to provide a sealing lip on the bottom of the cover plates instead of the plate-shaped sealing element. The sealing element need not be plate-shaped, but can also have the shape of an elongated flexible profile.

Preferably the sealing element has two flexible elements which is pressed [sic] again one edge of a third and a fourth of the four cover plates. The third and fourth cover plate are those cover plates which are offset with respect to the line of slope relative to the first and second cover plate and are arranged at the same height to one another. The flexible elements have for example the shape of arms or finger-like extensions. They adjoin the edge of the cover plates which points down in the direction of the line of slope.

Preferably the sealing element has a circular arc-shaped sealing lip which extends from a sealing lip which is attached to a third cover plate as far as to a sealing lip which is attached to the fourth cover plate. The third and fourth cover plate are located offset at the same height relative to the line of slope and opposite the first and second cover plate in the direction of the line of slope. In this way the tightness in the overlapping region of the cover plates can be additionally increased. The total of the thicknesses of the sealing element and of the circular arc-shaped sealing lip corresponds essentially to the total of the thicknesses of a cover plate with the sealing lip attached to it.

The cover plates have a conventional multilayer structure. The top which is used for weather protection is preferably a glass plate. Behind it are the solar cells which are potted in an elastic layer or are cemented to the glass plate. The bottom of the cover plate can be another glass plate (so that a so-called sandwich structure arises) or other opaque plate. Instead of glass plates there can also be transparent plastic plates. On the back of the cover plate there are also electrical terminals which are formed essentially by two cable pieces with electrical connectors. The length of the cable pieces is chosen such that cover plates laid adjacently can be connected to one another and can also be removed as selectively as possible from the arrangement if a defect occurs.

The solar cells toward the edge of the cover plate have a certain distance which corresponds to the scale-like overlapping. The distance is for example 1-3 cm. Furthermore, in one corner region there is a rectangular (especially square) region which is free of solar cells. The region which is free of solar cells has roughly the size of one solar cell. One advantageous arrangement arises when using $n^2-1$ solar cells.

The region which is free of solar cells after mounting of the cover plate is located under the corner of the cover plate which is located farther above.

The recess in the first corner region of the cover plate is larger than the one in the second. Thus it is possible to equip the fastening device with a wider lower and a narrower upper part so that the cover plates with the recess can be turned over the fastening device and can be kept at a different height.

But it is also possible to make the two recesses of the same size and to keep them at the correct height using aids which belong to the fastening device.

The fastening device preferably has a tubular support part and a tension device which is placed in a tubular support part. The support part bears the overlapping corners of the cover plates at a mutual distance and in predefined support positions by way of the support bar. The support part has a first stop for making available a first support position for a first corner region of the first cover plate. The first support position is at a given distance to the support bar so that the cover plate does not rest directly on the support bar. Furthermore, on the support part there is a second stop for making available a second support position for the second cover plate at a second distance to the support bar. The second stop can be formed by the top end of the support part. In this way the upper cover plate can move freely relative to the support part. The first corner region of the first cover plate is spaced by at least one thickness of a cover plate away from the second corner region of the second cover plate.

The tension device fixes the upper corners of the two cover plates, which corners lie on top of one another, relative to the support bar. Preferably the upper corner is pressed by the tension device onto the support part without resulting in rigid fixing. In a certain sense there is floating support (within certain boundaries). The tension device is implemented for example by a two-part pin and a cap. One (lower) end of the pin is fastened to the support bar and the other (upper) end bears the cap. The tubular support part can be moved to a certain extent. The second cover plate is also held, not rigidly, but slightly flexibly. The cover plates can thus be adjusted relative to the support bars. The different thermal expansion of the plate and bar is prevented from having an adverse effect.

The cap has a greater transverse elongation than the pin. The pin can be easily guided through the through opening in the cover plate, while the cap is designed to completely cover the passage opening. Preferably the transverse elongation of the cap on the lower (i.e. facing the cover plate) side corresponds to the transverse elongation of the support part. The upper cover plate is then held between two annular contact surfaces of roughly the same size. But it is also possible to make the cap larger or smaller than the transverse dimension of the support part.

Advantageously the pin is essentially two-part. The first part is dimensioned such that in the mounted state it does not project over the tubular support part. The second part is seated on the first part, i.e. can be detachably coupled to the first and constitutes the part of the pin which projects beyond the tubular support part. The second part is routed through the recess in the second corner region of the second cover plate.

The cap preferably has a through opening for a tensioning screw which can be screwed into a thread on the top end of the pin.

The two parts of the pin make it possible to remove individual cover plates from the overall combination with minimum effort and to replace them. Of the two fastening devices which hold the cover plate, one must be completely dismounted and the other half-dismounted.

The division of the pin can of course be different. A one-piece pin also lies within the framework of the invention.

The first support position can be formed by the fastening device with one shoulder which is made outside on the tubular support part and the second support position by the top end of the support part. The tubular support part therefore forms a type of hollow peg which can be inserted into the first recess of the first (i.e. lower) cover plate.

The support part can also be made such that it can be inserted both through the lower and also through the upper cover plate. In this case it tapers from bottom to top and is preferably staggered so that two defined shoulders are made available as support positions for the cover plates. Instead of a support part supported on the support bar there can also be support parts which are supported only on the pin. It is then however not possible to remove the pin without the support parts and the pertinent cover plates.

On at least one edge of the cover plates there can be a sealing lip on the top. It seals the gap which would otherwise exist between the cover plates which overlap in the manner of scales. Preferably the sealing lips are on the two abutting sides of the cover plates, i.e. on those edges which lie under the next higher cover plates which overlap them.

The sealing lips can be cemented on beforehand (i.e. industrially) or for example clipped on on site. But the sealing lips are not critical.

The invention is also embodied in a system of components for preparing a device for recovering solar power. This system of components consists of the following parts:

a) a preferably diamond-shaped cover plate which contains photovoltaic cells, b) a support bar with at least three prefabricated fastening sites, c) a fastening device for connecting the cover plate at this fastening site of the support bar.

These parts are available in any number so that the desired roof or facade part can be prepared. Special parts are not mentioned here; they are required for edge termination between the photovoltaic cover plates and the remaining vicinity to complete weather protection. The technical execution of the aforementioned system components is as follows:

d) The cover plate preferably has a first recess in the first corner region and a second recess preferably in a diagonally opposite second corner region. They are ultimately the locations on which the cover plate is held (preferably exclusively).

e) The fastening device and the two recesses of a cover plate are matched to one another such that the fastening device can engage the recess. This has the advantage that during installation first the fastening device can be fixed at the fastening site of the support bar and afterwards the cover plates can be placed on the fastening device.

f) The distances of the fastening sites correspond to the distance of the recesses of one cover plate. The cover plates are therefore laid and held diagonally with respect to the longitudinal direction of the support bars.

g) The fastening device is designed to hold preferably the first corner region of the cover plate in a first support position at a first distance to the support bar and preferably the second corner region of the cover plate in the second support position at a second distance to the support bar, the preferred first corner region of the first cover plate being spaced by at least one thickness of the cover plate away from the preferred second corner region of the second cover plate.

This system of components can preferably be equipped with the optional features which were explained above.

To prepare a device as claimed in the invention the procedure is as follows:

Several support bars are fixed on the prepared substructure (for example a roof truss). They should have a given tilt angle >0° to the horizontal and a uniform mutual distance transversely to the line of slope.

Accordingly the fastening devices (for example their pins) are attached to the prepared fastening sites of the support bars.

Finally, the tubular support part is located on the pins and the first corner region of a first cover plate is supported on the support part. In this way for example all cover plates which are located at the same height transversely to the line of slope are mounted with their lower (i.e. "second") corner region and their upper ("first") corner region. Afterwards a row of cover plates which is to be arranged next higher is installed.

Preferably, after arranging the first corner region and before clamping the second corner region a sealing element is attached to the fastening device.

Other advantageous embodiments and combinations of features of the invention will become apparent from the following detailed description and the totality of claims.

BRIEF DESCRIPTION OF DRAWINGS

The drawings are used for explanation of the exemplary embodiment.

FIG. 1 shows a top view of a weatherproof surface which is prepared with the component system as claimed in the invention, consisting of cover plates with photovoltaic cells;

FIG. 2 shows a schematic cross section along the line of slope;

FIG. 5a shows a top view of the cover plate with solar cells;

FIG. 5b shows a sectional view of the cover plate according to FIG. 5a;

FIG. 8a shows the top view of one version of a sealing element;

FIG. 8b shows a sectional view of the sealing element according to FIG. 8a;

FIG. 9a shows a detailed view of one end of the sealing element;

FIG. 9b shows a side view of the detailed view according to FIG. 9a;

FIG. 10a shows a side view of the sealing element according to FIG. 8a;

FIG. 10b shows a detailed view of the end of the sealing element according to FIG. 10a; and FIG. 11 shows a perspective of the sealing element according to FIG. 8a.

Fundamentally the same parts are provided with the same reference numbers.

EMBODIMENTS OF THE INVENTION

Figure 3:
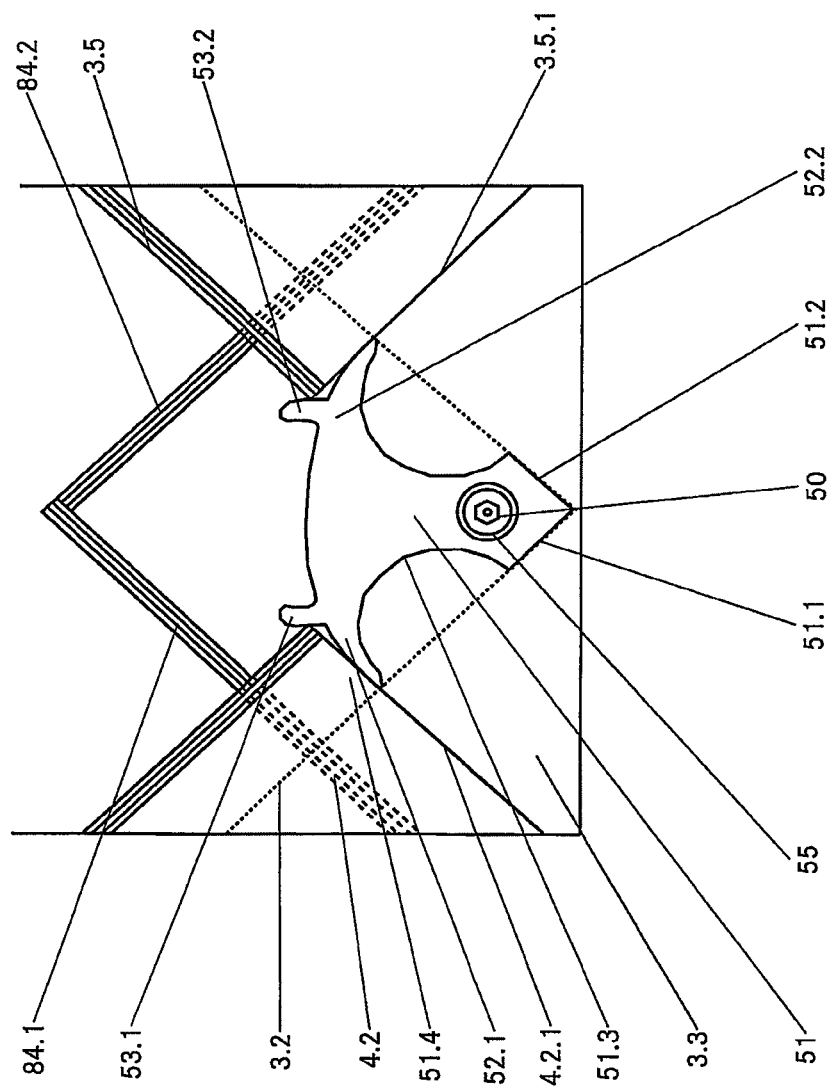
FIG. 3 shows a top view of the overlapping region.

FIG. 1 shows a system unit 1 with a surface 2 which captures sunlight and which is formed by several cover plates as claimed in the invention, hereinafter called plates 3.1, 3.2, 3.3, 3.4, 3.5, 4.1, 4.2, 5, 6.1, 6.2 for short. Not all plates need be provided with solar cells. The system unit 1 forms a weatherproof building enclosure. This building enclosure can be for example a roof (i.e. a tilted surface) or a facade (i.e. a vertical surface) of a building. The surface 2 which captures the sunlight is generally a plane, but with a corresponding configuration of the plates can also be a two- or three-dimensionally curved surface (cylinder envelope surface, spherical cap or other). The length and width of the surface 2 preferably depends on the size of the roof surface. Therefore the entire roof (or an entire roof side) is covered with the described system unit so that aesthetically a uniform picture and technically a closed, weatherproof building enclosure result.

The surface 2 has a lower edge 9.1 which lies transversely with respect to the line of slope A and an edge 9.2 which is aligned parallel to the line of slope A. The edges 9.1 and 9.2 abut at a right angle and form a corner 10 of the surface 2. The other, only schematically shown edges 9.3 and 9.4 border the surface to the top and side.

The individual plates 3.1, 3.2, 3.3, 3.4, 3.5, 4.1, 4.2, 5, 6.1, 6.2 underlie a basic shape 7 which is diamond-shaped with respect to a line of slope A. In particular the basic shape 7 of the individual plates is formed by a square shape which stands on one corner 8 such that a corner 14 opposite this corner 8 likewise lies on the line of slope A. This is called diagonal laying of the plates. Not each plate has the complete basic shape 7. Depending on its arrangement in the surface 2, the plates can have different shapes. FIG. 1 shows plates 3.1, . . . , 3.5, edge plates of the line of slope 4.1, 4.2, transverse edge plates 6.1, 6.2, and corner plates 5. The plates 3.1, . . . , 3.5 have a complete basic shape 7, for example a square shape standing on the corner 8.

The plates 4.1, 4.2 are located in the edge area 9.2 of the system unit 1, which area is parallel to the line of slope. The shape of the plates 4.1, 4.2 results from the straight-line division of the square regular basic shape 7 parallel to the line of slope A. The plates 6.1, 6.2 on the lower edge 9.1 of the surface 2 have different shapes which arise due to the straight-line division of the square regular basic shape 7, perpendicular to the line of slope A. In the corner 10 is the corner plate 5. The shapes of the plates 4.1, 4.2, 5, 6.1, 6.2 which are located on the edge are such that the surface 2 is altogether rectangular. The upper horizontal edge of the surface is provided for example on the ridge of the roof and the lower edge on the rain gutter. The plate 3.2 which is located in the interior of the surface 2 has six adjacent plates at a time (plates 3.1, 3.3, 3.4, 3.5 and the edge plates of the line of slope 4.1 and 4.2). The plate arrangement of the system unit 1 is described below using one plate 3.2 which has been chosen by way of example.

The plates 3.1 to 3.3 are arranged overlapping in the manner of scales in the direction of the line of slope A, the plate 3.2 being overlapped by the adjacent upper plate 3.1 in a square corner region 11.1 and the plate 3.3 being overlapped by the plate 3.2 in turn in a square corner region 11.2. In FIG. 1 the corner regions 11.1, 11.2 occupy only a small part of the entire surface of the plate 3.2, especially roughly one ninth or one sixteenth of the total surface.

Transversely to the line of slope A four laterally adjacent plates border the plate 3.2, specifically the plates 3.4 and 3.5 and the edge plates 4.1 and 4.2. The adjacent plates are arranged shifted relative to the plate 3.2 by a certain amount of overlapping less than one half diagonal length of the basic shape 7 in the direction A of the line of slope. Transversely to the line of slope A the adjacent plates are spaced such that overlapping regions form along the edges 13.1 to 13.4 of the plate 3.2. The distance transversely to the line of slope is therefore greater than half the diagonal length of the basic shape 7. The overlapping regions 12.1 to 12.4 perpendicular to the edges 13.1 to 13.4 have a dimension which is small compared to the edge length. In particular the dimension of the overlapping regions 12.1 to 12.4 perpendicular to the edge 13.1 to 13.4 corresponds roughly to one tenth of the edge length of the plate 3.2. Preferably the width of the overlapping regions 12.1 to 12.4 is not less than 2 cm.

With respect to the line of slope A, the two edge plates 4.1 and 4.2 as well as the two plates 3.4 and 3.5 are each located on the same side of the plate 3.2. The overlapping regions 12.3 and 12.4 are located in the region between the plate 3.2 and edge plates 4.1 and 4.2 and the regions 12.1 and 12.2 between the plate 3.2 and plates 3.4 and 3.5.

The plate 3.2 in the corner region 11.2 at the lower corner 8 has a through opening 20.2. The lower corner region 11.2 is bounded by imaginary extensions of the overlapping regions 12.1 and 12.4. The corner region 11.2 for example has roughly the size of a photovoltaic cell. Furthermore the plate 3.2 in the upper corner region 11.1 on one corner 14 diagonally opposite the corner 8 likewise has a through opening 15.2 which for an overlapping arrangement with the adjacent plate 3.1 in the line of slope A is located congruently with its opening 20.1. Likewise the through opening 20.2 is congruent with the through opening 15.3 of the plate 3.3. The upper through opening 20.1 is farther from the edge or from the corresponding corner of the plate 3.2 than the through opening 20.2.

The edge plates of the line of slope 4.1 and 4.2 have a shape which is formed by straight-line division along the dividing lines 16.1 and 16.2 of a plate corresponding to the shape of the plate 3.2 in the direction of the line of slope A. The edge plates of the line of slope 4.1 and 4.2 form a termination of the surface 2 to the edge 9.2 which is parallel to the line of slope. The dividing line 16.1 and 16.2 does not pass through the through openings of the edge plates of the line of slope 4 which correspond to the through openings 20.1, 20.2 and 15.2, 15.3 so that the edge plates of the line of slope 4.1, 4.2 likewise have through openings comparably to the plate 3.2 and can be fastened using these through openings. The dividing lines 16 coincide with the edge 9.2. The edge plates of the line of slope 4.1 and 4.2 are made identically.

The transverse edge plates 6.1 and 6.2 have a shape which is formed by straight-line division along the dividing lines 18.1 and 18.2 of a plate corresponding to the shape of the plate 3.2 transversely to the line of slope A. The transverse edge plates 6.1 and 6.2 form a termination of the surface 2 to the edge 9.1 which is perpendicular to the line of slope A. The location of the dividing lines 18.1 and 18.2 depends on the arrangement of the plates 3.3 which are located nearest the edge region 9.1 in the direction of the line of slope A. Depending on the distance, the dividing lines 18.1 and 18.2 are made coincident with the edge 9.1 so that an edge which passes in a straight line through the transverse edge plates 6.1, 6.2 arises. The transverse edge plates 6.1 and 6.2 are therefore not made uniform and differ as a result of the above described half diagonal shift of the plates which are adjacent in the direction perpendicular to the line of slope A.

The corner plate 5 has a shape which is attained for example by repeated division of the shape of the edge plates of the line of slope 4 in one direction perpendicular to the line of slope A. The location of the transversely lying dividing line 17 is chosen such that it coincides with the edge 9.1 or with the dividing lines 18.1 and 18.2 of the transverse edge plates 6.1 and 6.2. Edge-side edges of the corner plate 5 thus form the corner 10 which is bordered by the edges 9.1 and 9.2.

FIG. 2 shows a schematic section of the arrangement of the plates 3.1 to 3.3 in the direction of the line of slope A. The plate 3.1 lies in the overlapping region 11.1 above the plate 3.2, i.e. on the side which faces away from the support structure 30. In the region 11.2 in turn the plate 3.2 lies over the plate 3.3. The location of the plates 3.4 and 3.5 or of the edge plates of the line of slope 4.1 and 4.2 are shown by the broken line in FIG. 2. The plates 3.4, 3.5 and 4.1, 4.2 are arranged such that they are arranged at least in part in the regions 11.1 and 11.2 between the overlapping plates 3.1 and 3.2 as well as 3.2 and 3.3 which are adjacent in the direction of the line of slope A. In one system unit 1 as claimed in the invention all plates 3.1, 3.2, 3.3, 3.4, 3.5, 4.1, 4.2, 5, 6.1, 6.2 are arranged in the direction of the line of slope A according to the overlapping diagram shown in FIG. 2.

FIG. 3 shows an enlarged view of the overlapping regions 11.2 without the uppermost plate 3.2 (which is shown only as a broken line). In the overlapping region 11.2 there is a sealing element 51 between the plates 3.2 and 3.3. It is shaped such that it essentially fills the intermediate space formed by the plates 3.2, 3.3 and the plates 3.5 and 4.2 which are located in part in between. In other words, the gaps which exist in the spanning by the roof on the one hand between the plates 3.2 and 3.3 which overlap in sections and on the other hand the corners of the plates 4.2 and 3.5 spaced transversely to the line of slope are closed against wind and rain (which can be driven by the wind into the gaps). To achieve this, the sealing element 51 is made as follows.

It consists preferably of rubber-elastic material and has a material which corresponds roughly to the thickness of the plate 3.5. But it can be altogether slightly thicker so that the upper plate 3.2 is kept at a minimum distance of for example 1-2 mm over the plate 3.5 so that a capillary gap between the overlapping plates 3.2, 3.5 is not possible.

The sealing element 51 has a through opening 55 for the fastening device 50. It has a first and a second side 51.1, 51.2 which are for example at a right angle to one another and imitate the lower corner 8 of the upper plate 3.2 in terms of shape. The two sides 51.1 and 51.2 in the mounted state of the spanning by the roof as claimed in the invention are therefore flush with the corner 8 of the upper plate 3.2. Since the sealing element 51 is made to mirror symmetrically (with respect to the line of slope) only one half is described below. The side 51.1 is followed by a hemispherical concave side 51.3. The latter borders one of the two arms 52.1, 52.2 of the sealing element 51. The arm 52.1 adjoins the edge 4.2.1 of the laterally adjacent plate 4.2, which edge points down and runs obliquely to the line of slope (in the same way the arm 52.1 adjoins the edge 3.5.1 of the plate 3.5, which edge points down). The outermost end of the arm 52.1 is preferably directly under the edge (shown by the broken line) of the upper plate 3.2. The top side 51.4 of the sealing element 51 is for example likewise circular arc-shaped with a greater radius of curvature than the side 51.3. On the side 51.3 which is pointed up (with respect to the line of slope) two finger elements 53.1, 53.2 are molded and offer a flexible stop for the corners of the plates 4.2 and 3.5, which corners lie in the corner region 11.2. The plate-shaped sealing element 51 preferably does not project beyond the overlapping region 11.2. Subject to the recesses formed by the concave sides 51.3, the sealing element 51 has room in a triangle which is bordered by half of the overlapping region 11.2.

Figure 4:
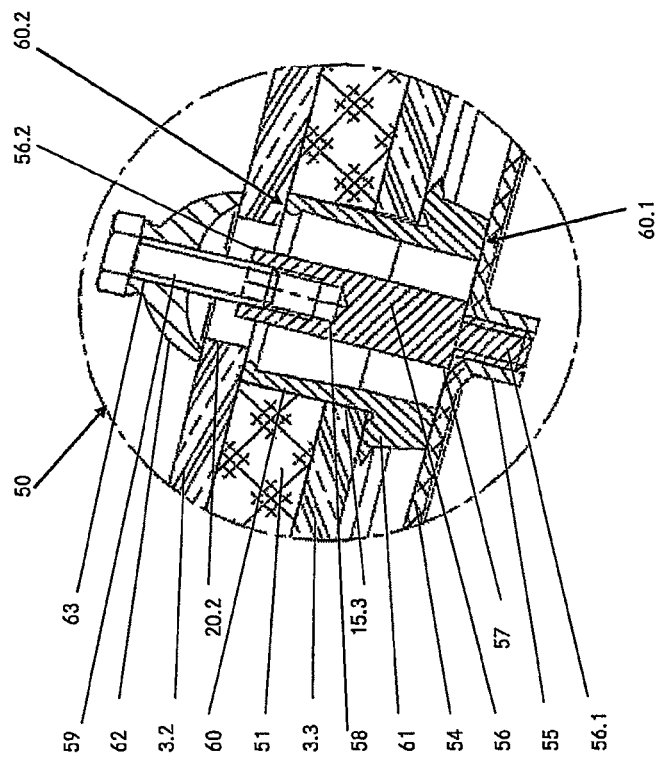
FIG. 4 shows a fastening device in cross section.
Figure 7:
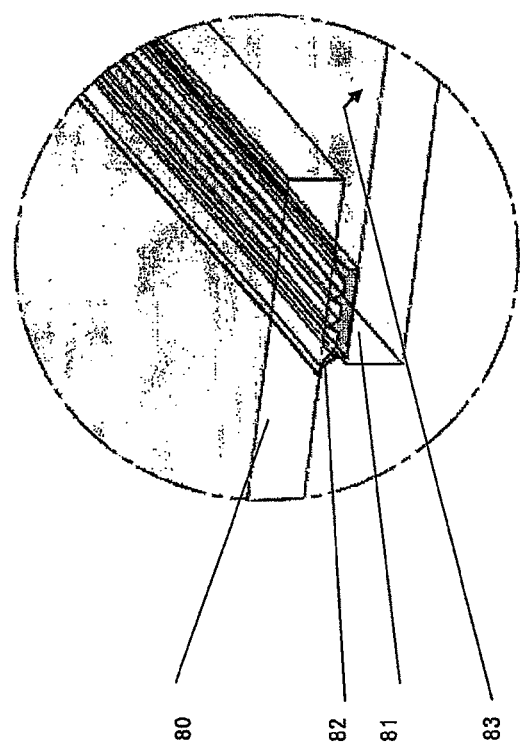
FIG. 7 shows a schematic of the sealing element attached at the top on the cover plate.

FIG. 4 shows one preferred embodiment of the fastening device 50. A support bar 54, of which only one wall extract is shown, has a threaded insert 55 which is made in the manner of a tube section which projects into the interior of the support bar 54, with an inside thread. The threaded insert 55 constitutes a mechanically prepared fastening site as claimed in the invention on the support bar 54. The end 56.1 of the pin 56 is screwed into this threaded insert 55 as far as a stop which is made on the pin 56 (for example, a shoulder 57). The pins 56 which consist preferably of stainless steel can therefore be rigidly connected to the support bar 54 and can project perpendicularly to the longitudinal axis of the support bar 54.

On its upper end 56.2 the pin 56 has a blind hole 58 with an internal thread for an external fastening screw 59. The pin 56 is located in the center of a tubular support part 60 of a preferably elastic material. The support part 60 with its lower face side 60.1 rests on the support bar 54. At a first distance to the lower face side 60.1 a first shoulder 61 is made which forms a first support position for the plate 3.3. The shoulder 61 runs around the support part 60 at a height which is for example less than half the height of the support part 60. Between the support bar 54 and the lower plate 3.3 there is therefore a distance which corresponds roughly to the thickness of one plate.

Above the shoulder 61 the outer cross section of the support part 60 is less than underneath the shoulder 61. The through opening 15.3 which is provided in the plate 3.3 is dimensioned such that the part of the support part 60 which is located above the shoulder 61 can be routed through it. Preferably the support part 60 can be attached in the through opening 15.3 in a press fit. This facilitates mounting since the plate 3.3 together with the support part 60 can be pulled over the pin 56. Fewer separate parts need be assembled at the building site.

The free inside diameter of the support part 60 in this example is clearly for example 30-100% larger than the diameter of the pin 56. In this way the cover plates can be adjusted relative to the support bars in a comparatively large range of variation (for example on the order of centimeters).

In the region of the fastening device the sealing element 51 lies on the plate 3.3 whose thickness in this example is roughly one fourth of the height of the support part 60. Its thickness is preferably greater than the thickness of the plate 3.3.

The through opening 20.2 in the upper plate 3.2 is smaller than the outer cross section of the upper end of the support part 60 so that the plate 3.2 can be supported on the support part 60 without the support part 60 projecting through the through opening 20.2. Since the fastening screw 59 must be routed through the through opening 20.2 from overhead, the diameter of the through opening should correspond at least to the diameter of the fastening screw 59 and should preferably be at least 20% greater.

In the embodiment as shown in FIG. 4, the pin 56 projects into the through opening 20.2, but does not penetrate it completely. This means that the pin does not project over the outer main surface of the plate 3.2. In other words, the pin 56 is longer than the support part 60, but shorter than the sum of the length of the support part 60 plus one plate thickness. In this way the plate 3.2 cannot slide away during mounting (i.e. before clamping tight).

The through opening 20.2 is covered by a dome-shaped cap against the penetration of rain water. The edge of the cap 62 therefore forms a sealing lip relative to the upper main surface of the plate 3.2. The cap 62 has a central opening 63 for the fastening screw 59. The cap 62 is elastic so that it ensures a peripherally running seal around the through opening 20.2 when the fastening screw 59 is tightened. At the same time it allows flexible (i.e. not rigid) holding of the plate 3.2. In this way distortions can be equalized which can arise for different thermal expansion of plates, support bars and the fastening device.

The lower edge of the cap 62 which lies on the plate 3.2 is annular and has roughly the same diameter as the upper face side 60.2 of the support part 60 on which the plate 3.2 rests. As is apparent in FIG. 4, the upper edge of the support part 60 is relatively thin. In particular, it is thinner than the lower edge which rests on the support bar 54.

The dome shape of the cap 62 makes the connection between the fastening screw 59 and the plate 3.2 elastic in the direction of the pin axis. At the same time there is also a certain elasticity of holding transversely to the pin axis.

FIG. 5a shows a plate 100 which is designed as a solar panel or photovoltaic module. The plate 100 has a square or diamond outline with four edges 101.1, . . . , 101.4 and is aligned with reference to the line of slope A such that the square is on one corner 102 and a diagonally opposite corner 103 is likewise on the line of slope A which passes through the corner 102. The corner 102 is called "down" (with respect to the line of slope) and the corner 103 is called "up".

FIG. 5b shows a section through the plate 100 along the line of slope A (in plane B). The plate 100 encompasses a square plate 104, for example of plastic or glass. The plate 104 lies outside here, i.e. during installation according to plates 3.1, . . . , 3.5 of FIGS. 1-3 on the side facing away from the support structure 30. On the back, i.e. on the side facing away from the surface 30, a film or another glass or plastic plate 105 can be applied. Between the plates 104 and 105 there are solar cells 106.1, 106.2, 106.3 which are made as square panes in FIGS. 5a and 5b. The solar cells 106 can however also be configured as strips or in any other shape which appears suitable. In FIGS. 5a, 5b there are 15 solar cells 106.1, 106.2, 106.3 which each have a square outline. The square solar cells 106.1, 106.2, 106.3 are arranged in a regular 4×4 pattern with edges aligned parallel to the edges 109 of the basic shape 101, in one corner of the 4×4 pattern one solar cell being omitted ("$n^2-1$" arrangement).

Adjacent solar cells have a first distance 107 to one another. The solar cells which lie on one edge of the square outline 101 of the plate 100 are moreover spaced by a second distance 108 away from the edge of the basic outline 101. On the upper corner 103 a square region 110 is left open (i.e. it does not have a solar cell) which corresponds to the area which a sixteenth solar cell would occupy in a regular 4×4 pattern. The solar cells 106 are cabled to one another and on the back preferably have a possibility for tapping of the generated solar power (cabling and tap not shown). It can be for example a plug outlet or cable connections.

The second distance 108 which is drawn to the edge 109.4 corresponds roughly to one twentieth of the edge length of the square outline 101. The indicated distance 108 can however if necessary also be chosen differently and is preferably larger than 2 cm, in particular the distance 108 can be roughly 3.5 cm. The first distance 107 which exists between adjacent solar cells can be varied within wide limits. For maximum utilization of incident solar radiation it is chosen to be as small as possible. But if the plate is however also to be used for light inlet, the distance 107 is chosen to be larger. In the figure the first distance 107 is roughly one tenth of the second distance 108.

The second distance 108 is preferably chosen such that it corresponds essentially to the width of the overlapping regions 12.1, . . . , 12.4 in the direction perpendicular to the edges 13.1, . . . , 13.4 when installed according to FIGS. 1 to 3. This results in that due to the overlapping of adjacent plates no solar cell is hidden. For the same reasons the region 110 left open on the upper corner 103 is preferably dimensioned such that it corresponds to the overlapping region 11.1 or 11.2 of the plates which are adjacent in the direction A of the line of slope, for example 3.1-3.3, when the plate is installed according to FIGS. 1 to 3.

Within the framework of the preferred execution of the distance 108 and of the region 110 which are dictated by the arrangement of plates 100 in the overlapping as claimed in the invention, the distance 107 however and the size and number of individual solar cells 106 can be matched depending on the requirement. For example, it is also conceivable to arrange only 8 solar cells in a regular 3×3 pattern, in turn the missing field being made on an upper corner. Likewise strip-shaped solar cells can be used which leave exposed the regions on the plate 100 which are preferably to be kept free.

The plate 100 similarly to the version of the plates 3 of FIGS. 1 to 3 has an upper and a lower through opening 111 or 112, the upper through opening 111 being larger than the lower through opening 112. The lower through opening 112 is made in a corner section which is free of solar cells on the corner 102. The through opening 112 passes through the outside plate 104 and the rear plate or film 105 and lies on the line of slope A which passes through the corners 102 and 103 of the plate 100.

The upper through opening 111 is made in the region 110 which is free of solar cells. The latter corresponds in size roughly to the corner region 11.1 or 11.2, as is shown in FIG. 1. In particular the through opening 111 is formed on the lower (i.e. pointed toward the center of the plate) corner 113 of the square region 110 and likewise lies on the line of slope A. But it is also conceivable to make the passage openings on other regions of the plate 100 which are free of solar cells. Depending on the arrangement of the plates 100 in overlapping and/or fastening arrangements for fastening of the plates 100, the through openings can also be arranged horizontally in the region between two solar cells and/or not on the line of slope A.

Figure 6:
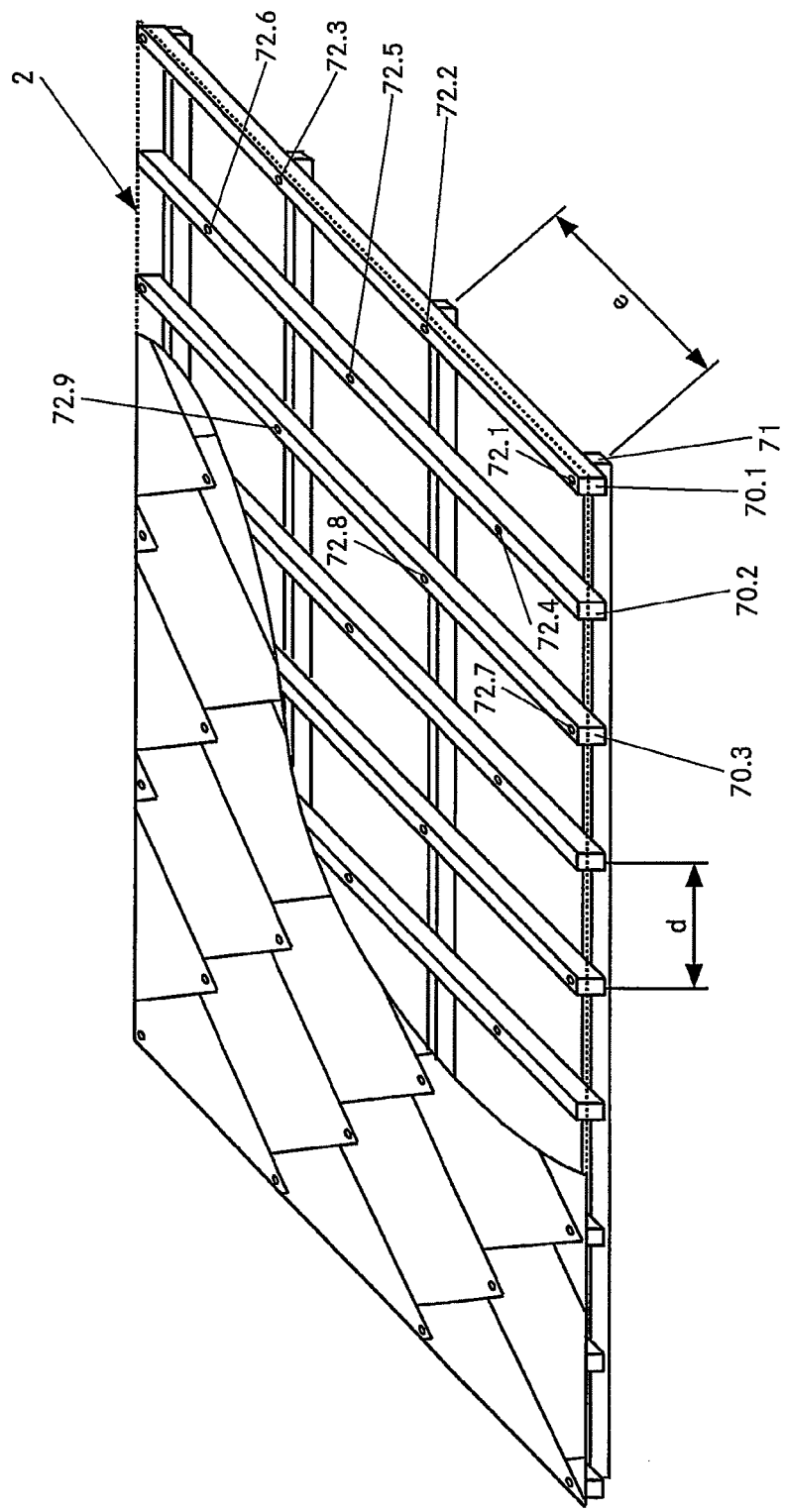
FIG. 6 shows a schematic of the system unit 1.

FIG. 6 shows how the photovoltaic outer building skin is mounted. First, several support bars 70.1-70.3 are fixed on the substructure 71 for the roof. The support bars 70.1, 70.2, 70.3 are for example steel sections and are each provided with several industrially prepared fastening sites 72.1 . . . 72.3 and 72.4 . . . 72.6 and 72.7 . . . 72.9. Each fastening site 72.1, 72.6 includes a fastening device 50 (FIG. 4) with which two plate corners at a time can be connected to the support bar. Each plate on two diagonally opposite corner regions (compare through openings 111, 112 in FIG. 5) are connected to a support bar. If the edge plates are ignored, one fastening device per cover plate as claimed in the invention must be prepared.

The adjacent fastening sites 72.1 and 72.2 have a distance e corresponding to the mutual distance of the through openings 111 and 112 of one plate (FIG. 5a, 5b). In a 4×4 arrangement of the solar cells in the plate the distance is roughly ¾ of the diagonal of the plate, in a 5×5 arrangement the distance is roughly ⅘ of the diagonal of the plate. Generally the distance of the fastening sites for square plates is roughly $(n-1)/n$ of the diagonal of the plate.

The support bars are screwed tightly on the substructure 71 and span the surface 2 which captures the sunlight. The mutual distance d of the longitudinal center axes of the support bars 70.1-70.3 follows from the desired geometry of the plate arrangement. For square cover plates the distance d is larger by a certain amount c than the half diagonal of the cover plates. The amount c is smaller than the half diagonal of the region 110 which is free of solar cells and which is detailed in FIG. 5.

The fastening sites 72.1, 72.2 and 72.4, 72.5 of adjacent support bars 70.1, 70.2 are offset to one another in the direction of the line of slope so that diagonal laying of the cover plates is possible. Preferably the support parts 70.1, . . . , 70.3 are produced and delivered with fastening sites which are made offset accordingly so that the support bars 70.1, . . . , 70.3 can always be mounted on site flush with the planned edge of the surface 2. In this example therefore at least two different types of support bars 70.1 and 70.2 are prepared industrially and differ from one another in that the fastening which is the first at the time is spaced differently relative to the end of the support bar. In this way it is possible to prepare the part of the outer building skin as claimed in the invention as an industrially fabricated system unit. This reduces installation costs.

At this point the pins (compare FIG. 4, pin 56) can be attached at the fastening sites 72.1, . . . 72.9. In the sense of one version the pins can be attached industrially to the support bars so that the support bars with the pins mounted can be delivered to the building site and fewer individual parts need be mounted at the building site.

Afterwards the cover plates are installed. Generally first the edge plates must be installed along the lower end of the support bars. The roofer works from right to left or vice versa and lays one row which is located at the same height. Since mounting of the edge plates takes place essentially according to the same principle as for the plates, only laying of one (further) row of plates is explained below.

One support part (FIG. 4 support part 60) is laid over the pins on which the upper corner of the plate is to be attached. Then the plate is placed on the support parts of the adjacent fastening sites of the support bar. In doing so the lower through opening (compare 112 in FIG. 5a) is placed on the upper face side of the support part of the lower fastening site and the upper through opening (compare 111 in FIG. 5a) on the shoulder (FIG. 4, shoulder 61) of the upper fastening site.

Next, the sealing element (compare 51 in FIG. 3) is placed on the support part 60. Since the sealing element can be turned around the support element, it can be easily placed in the position which is suitable for the adjacent cover plates.

To tightly clamp the cover plate, the screw 59 is inserted through the cap 62 and is screwed into the pin 56. Here the cover plate is not held in an immovable position, but can be shifted somewhat as required transversely to the line of slope or along the line of slope. Since the plate is clamped only between the rubber parts (support part/cap), therefore adjustment can also take place after attaching the screw 59. The preferred fastening device allows a relatively stable connection between the lower corner of the cover plate and the support bar.

As is shown in FIGS. 3 and 4, there can be a sealing lip 82 between two overlapping cover plates 80, 81. This lip is attached on the upper main surface 83 of the lower cover plate 81. The same seal can be provided on the side of the cover plate which is mirror-symmetrical with respect to the line of slope. This "over corner" arrangement is shown in FIG. 3 using the sealing lips 84.1, 84.2. The two remaining (or diagonally opposite) sides conversely do not have these sealing lips.

FIG. 8a shows a top view of one version of a sealing element 51. FIG. 8b shows a corresponding section of the sealing element along the section line A-A. FIG. 8a shows the sealing element 51 together with plates 3.2, 3.3, 4.2, 3.5, FIG. 8b shows the sealing element 51 without these plates. As already shown in FIG. 3, the version of the sealing element 51 now being discussed is located between the plates 3.2 and 3.3. The plate 3.2 is shown in FIG. 8a only by the broken line, in order to specify the site at which this plate comes to rest. The plate 3.3 is shown in extract in FIG. 8a. The sealing element is shaped such that it seals the intermediate space formed by the plates 3.2, 3.3 and the plates 4.2 and 3.5 which are arranged in part in between. The plates 4.2 and 3.5 are shown in extract in FIG. 8a, the plate 4.2 being located to the left of plate 3.2 and the plate 3.5 to the right of plate 3.3.

The sealing element 51 has a through opening 55. In the installed state the sealing element 51 rests on the plate 3.2 and can be cemented for example on the plate 3.2. The circular arc-shaped arms 52.1, 52.2 which are shaped to one another, specifically the left arm 52.1 and the right arm 52.2, extend from the left plate 4.2 to the right plate 3.5. On the circular arc-shaped arms 52.1 and 52.2 a sealing lip 84.3 which is circular arc-shaped relative to the through opening 55 is molded.

As is known from FIG. 3, the sealing lips 84.1 and 84.2 are attached to the edges of the plate 3.2. Likewise, on the edges of the left plate 4.2 a sealing lip 84.5 and of the right plate 3.5 a sealing lip 84.6 are attached. The sealing lips 84.1, 84.2, 84.5, 84.6 can be for example cemented on.

The circular arc-shaped arms 52.1 and 52.2 encompass one left end 52.11 and one right end 52.21 which directly adjoin the cover plates 4.2 and 3.5, at this point a sealing site between the cover plates and the sealing element 51 being formed. As is shown in FIG. 8*a*, one region of the ends 52.11, 52.21 runs parallel to the sealing lip 84.1, 84.2.

The sealing element 51 and/or the circular sealing lip 84.3 consist preferably of a rubber-elastic material. Materials for the sealing lip 84.3, but also for the sealing lips 84.1, 84.2, 84.5, 84.6 can be for example EPDM (ethylene-propylene-diene rubber) or a silicone. The rubber elastic material is preferably made soft so that a small contact pressure of the plates is enough to establish a seal. The thickness of the sealing element 51 with the circular sealing lip 84.3 corresponds to the sum of the thickness of one plate 3.5 and the thickness of the sealing lip 84.1, 84.2. The thickness of the ends 52.11, 52.21 corresponds to the thickness of the sealing lips 84.1, 84.2.

With the cover plate 3.2 installed, between the plate 3.2 and the plate 4.2 a seal is established along the sealing lip 84.5 of the left plate 4.2, between the plate 3.2 and the plate 3.3 along the sealing lip 84.3 of the sealing element 51, and between the plate 3.2 and the plate 3.5 along the sealing lip 84.6 of the right plate. Thus the cover plate 3.2 is completely sealed relative to the underlying plates along a closed line.

Moreover, there is a seal between the plate 4.2 and the underlying plate 3.3 along the sealing lip 84.1 and a corresponding seal between the plate 3.5 and the plate 3.3 along the sealing lip 84.2. A closed and complete union of seals is formed on the ends 52.11 and 52.21 of the sealing element 51 by a seal existing between the sealing lip 84.1 and the end 52.11 (or the sealing lip 84.2 and the end 52.21) which adjoin one another along corresponding side surfaces, and by a seal existing between the face side of the plate 4.2 and the face side of the end 52.11 (or between the face sides of the plate 3.5 and the end 52.21).

FIG. 9*a* shows a detailed view of the end 52.21 of the sealing element 51 which is labelled C in FIG. 8*a*. As is apparent from FIG. 9*a*, the end 52.21 has a straight area 52.210 which adjoins one side of the sealing lip 84.2. In this way a seal is formed between the end 52.21 and the sealing lip 84.2. The end 52.21 furthermore has a step, as is apparent from FIG. 9*b*, the thickness of the thinner part corresponding to the thickness of the sealing lip 84.2 and the thickness of the thicker part corresponding to the sum of the thickness of one plate 4.2 and one sealing lip 84.2.

In order to effect deformability of the sealing lips and thus a seal, the sealing lips 84.1, 84.2, 84.3, 84.5, 84.6 have different flanks with the corresponding 45° flank angle. On the ends 52.11, 52.21 these 45° flanks are also continued for the thinner part. In the middle region 52.211 of the end 52.21 (or analogously of the end 52.11) the flanks of the sealing lips are interrupted as shown in FIG. 9*a*, so that the bendability and deformability are additionally increased so that the ends 52.11, 52.21 rest for example more lightly on the plates 4.2, 3.5.

Figure 10B:
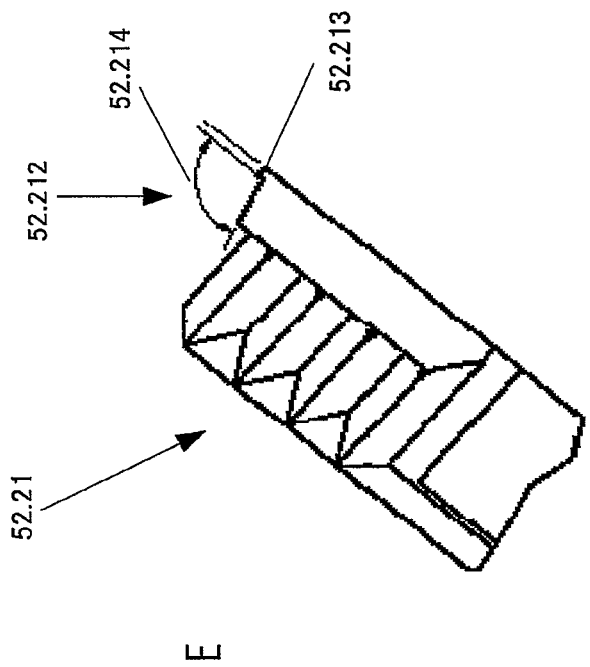
Figure 10A:
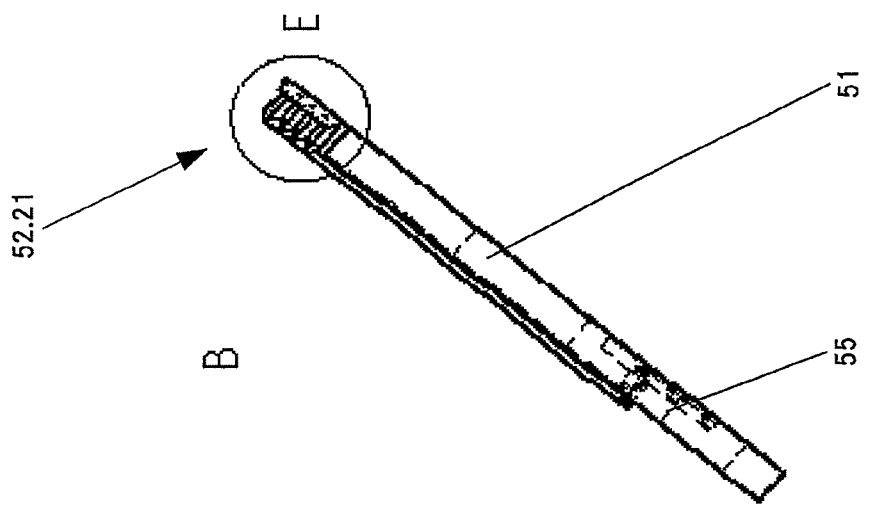

FIG. 10*a* shows the side view B of the sealing element 51 marked in FIG. 9*a*. The sealing element 51 encompasses the through opening 55 and the right end 52.21. In FIG. 10*b* in the detailed view E the right end 52.21 is shown enlarged. As is apparent from FIG. 10*b*, the end 52.21 encompasses several flanks with a 45° flank angle. The side 52.212 of the sealing element 51 facing the sealing lip 84.2 in the installed state has a cam 52.213 and has a tilt angle 52.214 which can be for example 105°. In this way the side 52.212 is matched to the shape of the sealing lip 84.2, as a result of which installation of the sealing element 51 is simplified and the seal is improved. Sealing between the sealing lip 84.2 and the end 52.21 can be additionally improved by the choice of the angle of incline 52.214 and the shape of the cam 52.213. Thus a cam which is shaped half-round or oval can be used which is favorably deformed with the corresponding pressure of the overlying plates in the direction of the sealing lip 84.2 and thus increases the seal.

FIG. 11 is a perspective of the described version of the sealing element 51 and shows the through opening 55, the two ends 52.11 and 52.21 and the sealing lip 84.3.

A roof which is built with the described cover plates and sealing elements is also rainwater-tight even for relatively small overlapping of the cover plates of for example 3 cm and a small slope of the cover plates of for example 5°.

The described embodiments can be modified in various respects.

In the fastening device the support part, instead of a round cross section, can have a different outer cross section (for example an oval or polygonal cross section). The free inner cross section can also be non-circularly symmetrical instead of circular (with free adjustability in all directions). For example, a slot-shaped cross section which limits the adjustability to one direction should also be mentioned.

Instead of a threaded insert, a projecting threaded pin can be attached to the fastening sites. A pipe piece with an inner thread can for example be screwed onto this pin.

The pin 56 need not consist of steel. It could for example be made also as a plastic molding to which the support part is captively attached.

In the figures the recesses are made as round through openings. The shape of the recess can however also be non-round. In particular, it is also conceivable for the recess to open in the lower corner toward the edge (whether toward the corner or toward an edge site which lies next to the corner). Another modification consists in that the upper through opening is replaced by a coupling device which is attached on the back of the cover plate. It could for example be operated from the face side of the cover plate. The advantage of this construction consists in that the surface which captures the sunlight is not interrupted. The building skin facing the weather would then not have any projecting parts.

The cover plates need not be square. In particular the corners can be rounded or cut off. Furthermore, it is possible to recess the plate in the square region 110 free of solar cells (or to cut off the corner 103), so that the region free of solar cells is for example only half as large or much smaller in terms of material, as shown in FIG. 5*a*.

It is important that the three sealing systems, specifically the cap (62), the plate-shaped sealing element (51) and the sealing lip (82) can also be properly used for "straight" laying. Each of these three sealing systems can also be used individually, i.e. independently of the others.

In summary, it can be maintained that the invention makes available a unit which forms an integrated part of the weatherproof building skin. The unit acts aesthetically not as an addition, but as the character of the building jacket. Finally, mounting is easy and defective cover plates can also be subsequently replaced with little effort.

The invention claimed is:

1. A system for generating solar power to a building, comprising:
   a) at least four diamond-shaped cover plates for forming a surface to capture sunlight having photovoltaic elements being contained within the cover plates powered by the sunlight to generate the solar power;
   b) at least one support bar mounted to an existing wall or roof structure of the building without any bridging between adjacent support bars arranged at a predetermined roof slope with at least three prefabricated fastening sites;
   c) a fastening device mechanically connecting the cover plates to the fastening sites on the at least one support bar;
   d) the cover plates arranged diagonally to overlap one another in a scale configuration with respect to the longitudinal direction of the support bars to capture the sunlight and to repel rain water;
   e) each cover plate includes a first recess through opening in a first corner region and includes a second recess through opening in a diagonally opposite second corner region; and
   f) the fastening device holding the first corner region of a first cover plate in a first support position at a predetermined distance above the support bar and the fastening device holding the second corner region of a second cover plate in a second support position resting on a top surface of the fastening device above the first support position, the first corner region of the first cover plate being spaced by at least one thickness of the cover plate away from the second corner region of the second cover plate and wherein the fastening device includes a nonconductive tubular support part and a pin placed within a center axis of the tubular support part having one end fixedly fastened to the support bar and having an opposite end with a clamping device for flexible holding of the second cover plate.

2. A system for generating solar power to a building of claim 1, wherein the support bar consists of steel and wherein the prefabricated fastening sites are threaded inserts.

3. A system for generating solar power to a building of claim 1, wherein there are several support bars spaced apart in a parallel relationship with respect to each other and wherein all cover plates are fixedly suspended above the support bars by the fastening device and wherein the support bars have a length corresponding to an extension of the existing roof structure in the direction of the line of slope.

4. A system for generating solar power to a building of claim 1, wherein the second corner region of the second cover plate overlaps the first corner region of the first cover plate in the scales configuration over the fastening site, and wherein a plate-shaped sealing element is located between two corner regions of overlapping cover plates and has a thickness corresponding to at least to the thickness of one of the at least four diamond-shaped cover plates.

5. A system for generating solar power to a building of claim 4, wherein the sealing element has two flexible elements which presses against one edge of a third and a fourth of the four cover plates, the third and the fourth cover plate being located at the same height with respect to the line of slope and being located offset relative to the first and second cover plate in the direction of the line of slope.

6. A system for generating solar power to a building of claim 4, wherein the sealing element has a first circular arc-shaped sealing lip which extends from a second sealing lip attached on the third cover plate to a third sealing lip attached on a fourth cover plate, the third and the fourth cover plate being located at the same height with respect to the line of slope and being located offset relative to the first and second cover plates in the direction of the line of slope.

7. A system for generating solar power to a building of claim 1, wherein the cover plates have a multilayer structure of two outside glass plates and a solar cell layer which is located in between.

8. A system for generating solar power to a building of claim 7, wherein the solar cell layer includes generally square solar cells and wherein the first and second corner regions are a generally square configuration free of solar cells.

9. A system for generating solar power to a building of claim 1, wherein the recess through opening in the first corner region of the cover plates is larger than the recess through opening in the second corner region.

10. A system for generating solar power to a building of claim 1, wherein the pin is two-part, a first part projecting above the tubular support part by no more than one thickness of the cover plate, and a second part guided through a cap sealing the second recess through opening in the cover plate.

11. A system for generating solar power to a building of claim 1, wherein the first support position is formed by a shoulder configured on a lower outer perimeter surface of the tubular support part and the second support position is formed by an upper end of the support part.

12. A system for generating solar power to a building of claim 1, wherein there is a sealing lip on at least one edge of the cover plates.

13. A system for generating solar power to a building of claim 1, wherein the fastening device for connecting two cover plates to a support bar includes the tubular support part to provide a first stop for making the first support position for the first corner region of the first cover plate suspended above the support bar a predetermined distance and with a second stop for making the second support position for the second cover plate above the first support position with respect to the support bar such that the first corner region of the first cover plate is spaced by at least one thickness of a cover plate away from the second corner region of the second cover plate.

14. A system for generating solar power to a building of claim 13, further comprising a tension element with a pin and a cap, said pin is centrally located within the tubular support part.

15. A system for generating solar power to a building of claim 14, wherein the cap includes a larger diameter than the pin and wherein the cap diameter corresponds generally to the diameter of the tubular support part fastening device.

16. A system for generating solar power to a building of claim 14, wherein the cap has an opening for a tension screw insertion and wherein the pin on one end includes a thread for the tension screw.

17. A system for generating solar power to a building of claim 1, wherein each cover plate includes the first and second recess through openings of different sizes in the diagonally opposite corner regions of each cover plate.

18. A system for generating solar power to a building of claim 17, wherein the plate is diamond-shaped and is provided with solar cells in an arrangement, whereby the two diagonally opposite corner regions of the cover plate are free of solar cells.

19. A system for generating solar power to a building of claim 1, wherein each support bar extends generally in the direction of the line of slope and from a roof ridge to a lower edge of the roof.

20. A building system for generating solar power, comprising:
- a) a diamond-shaped cover plate having photovoltaic cells therein:
- b) a support bar with at least three prefabricated threaded holes;
- c) a fastening device for connecting the cover plate to the threaded holes on the support bar;
- d) the cover plate includes a first corner region having a first recess through opening and a second recess through opening in a diagonally opposite second corner region; and
- e) wherein the fastening device and the first and second recess through openings of overlapping cover plates are aligned to one another such that the fastening device engages the first and second recess through openings; and
- f) wherein the threaded holes each correspond to the first and second recess through openings of the each cover plate so that the cover plates are arranged diagonally to overlap one another to form a scale pattern with respect to the longitudinal direction of the support bar; and
- g) wherein the fastening device for holding the first region of the cover plate in a first support position at a predetermined distance above the support bar and the fastening device holding the second corner region of the cover plate in a second support position resting on a top surface of the fastening device above the first support position with respect to the support bar, whereby the first corner region of a first cover plate being spaced by at least one thickness of the cover plate away from the second corner region of a second cover plate;
- h) each fastening device includes a pin removably attached to the threaded holes of each support bar;
- i) each fastening device includes a tubular support part for engaging the first and second recess through openings of each cover plate and the tubular support part is mounted over the pin that is axially aligned therein and the first corner region of the first cover plate is supported on a shoulder of the tubular support part above a top surface of the support bar.

21. A device as claimed in claim 20, wherein
- a) the support bare provides several threaded holes fixed at a predetermined spaced apart distance from each other on the support bar to cover an existing substructure of a building,
- b) the second cover plate is clamped to the second corner region of the first cover plate on a top surface of the tubular support part.

22. A device as claimed in claim 21 wherein after placing the first corner region of the second plate on the shoulder of the support bar and before clamping second corner region of the first plate a sealing element is attached to the fastening device between the first and second cover plates.

23. A solar power overlay system for a building, comprising:
- a plurality of elongated support bars aligned in parallel to each other having a top surface with threaded holes spaced apart a predetermined distance from each other along a longitudinal axis of each support bar for providing mechanical fastening sites to the support bars;
- a fastening device for mechanically engaging the threaded holes on each support bar including a pin with threads on one end matching the threaded holes in the support bars for mounting the pin on each support bar and a stop located above the pin threads allowing the pin to fixedly screw into the threaded support bar holes perpendicularly to the longitudinal axis of the support bar to the stop and a threaded hole at the other end of the pin for fastening an external screw, a tubular support part including an axial opening extending through the length of the tubular support with the pin generally located in the axial opening of the tubular support part and extending therethrough, the tubular support part further including a bottom portion resting on the support bars, the tubular support part including a shoulder located above the bottom portion and a generally flat to portion, the fastening device further including an elastic cap with a center hole corresponding to the diameter of the external screw;
- a cover plate configured as a solar panel or photovoltaic module having a square or diamond outline with four edges generally orientated diagonally along the longitudinal axis of each support bar, each cover plate including upper and lower through openings at opposing diagonal diamond edges with the upper through opening larger than the lower through opening; and
- wherein the mounting the cover plates on each support bar consists of placing the upper through opening of a first cover plate over the tubular support part until the edge of the cover plate with the upper through opening is resting on the shoulder of the tubular support part and the edge of the lower through opening of a second plate overlays the first plate and rests on the flat top portion of the tubular support part and the external screw is inserted through the center hole of the elastic cap into the threaded hole and tightened with the elastic cap placed over the lower through opening of the second plate to fixedly seal the first and second plates together in a watertight engagement to provide a scale-like configuration of overlapping plates.

24. The solar power overlay system for a building of claim 23, wherein each plate is fixedly attached to only one support bar at the upper and lower through openings by the fastening device.

25. The solar power overlay system for a building of claim 23, wherein the pin and external screw are made of stainless steel.

26. The solar power overlay system for a building of claim 23, further including a circular arc-shaped sealing element mounted fixedly over the tubular support part of the fastening device between an overlapping portion of adjacent plates fasten on the support bar.

27. The solar power overlay system for a building of claim 23, wherein
the support bars are spaced apart a predetermined distance from one another without bridging therebetween and mounted on an existing wall or roof structure of the building to provide the solar power overlay system.

28. The solar power overlay system for a building of claim 26, further including a pair of strip sealing elements joined at a right angle to each other adjacent the circular-arc shaped sealing element between overlapping plates on a support bar.

29. The solar power overlay system for a building of claim 28, wherein the sealing elements are made of an ethylene-propylene-diene rubber or a silicone.

30. The solar power overlay system for a building of claim 23, wherein the tubular support part provides a non-conductive electrical isolation of the solar plates from the support bars made out of generally steel materials.

* * * * *